United States Patent
Choy et al.

(10) Patent No.: US 9,808,781 B2
(45) Date of Patent: Nov. 7, 2017

(54) CONDUCTIVE METAL NETWORKS INCLUDING METAL NANOWIRES AND METAL NANOPARTICLES AND METHODS OF FABRICATING THE SAME

(71) Applicant: THE UNIVERSITY OF HONG KONG, Hong Kong (CN)

(72) Inventors: Wallace C. H. Choy, Hong Kong (CN); Haifei Lu, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 446 days.

(21) Appl. No.: 14/455,584

(22) Filed: Aug. 8, 2014

(65) Prior Publication Data
US 2016/0038909 A1 Feb. 11, 2016

(51) Int. Cl.
| | |
|---|---|
| H01B 1/02 | (2006.01) |
| B82Y 40/00 | (2011.01) |
| B01J 19/12 | (2006.01) |
| B82Y 30/00 | (2011.01) |
| H01B 13/00 | (2006.01) |
| H01B 13/30 | (2006.01) |

(52) U.S. Cl.
CPC ............ *B01J 19/127* (2013.01); *B82Y 30/00* (2013.01); *H01B 13/0026* (2013.01); *H01B 13/30* (2013.01); *B01J 2219/089* (2013.01); *B82Y 40/00* (2013.01)

(58) Field of Classification Search
CPC .................................. H01B 1/02; B82Y 40/00
See application file for complete search history.

(56) References Cited

U.S. PATENT DOCUMENTS

| | | | | |
|---|---|---|---|---|
| 2011/0223480 A1* | 9/2011 | Wee | ....................... | B82Y 30/00 429/218.1 |
| 2014/0084266 A1* | 3/2014 | Yang | ..................... | H01L 51/442 257/40 |
| 2015/0104936 A1* | 4/2015 | Markovich | ..... | H01L 31/022466 438/610 |

FOREIGN PATENT DOCUMENTS

| | | | |
|---|---|---|---|
| WO | WO2013128458 | * | 9/2013 |
| WO | WO2016122411 | * | 8/2016 |

OTHER PUBLICATIONS

Decoration of ZnO nanowires with Pt nanoparticles and their improved gas sensing and photocatalytic performance, Zhang et al., Nanotechnology 21 (2010) 285501.*
Synthesis and Study of Plasmon-Induced Carrier Behavior at Ag/TiO2 Nanowires, Sun et al. (Chem. Eur. J. 2012, 18, 8508-8514).*
Photovoltage Mechanism for Room Light Conversion of Citrate Stabilized Silver Nanocrystal Seeds to Large Nanoprisms, Wu et al., J. Am. Chem. Soc. 2008, 130, 9500-9506.*
Sol-Gel Technologies for Glass Producers and Users, Doctor Blade, Berni et al., 2004, pp. 89-92.*
Light-Induced Selective Deposition of Metals on Gold-Tipped CdSe-Seeded CdS Nanorods, Li et al., J. Am. Chem. Soc. 2011, 133, 672-675.*

* cited by examiner

*Primary Examiner* — Khanh Tuan Nguyen
*Assistant Examiner* — Haidung Nguyen
(74) *Attorney, Agent, or Firm* — Saliwanchik, Lloyd & Eisenschenk (57) ABSTRACT

Methods for the fabrication of transparent conductive metal nanowire networks are provided, as well as metal nanowire networks fabricated by such methods. A metal nanowire network can be immersed in a solution and illuminated for a duration of time. Selective nucleation and growth of metal nanoparticles can be induced at the junctions between metal nanowires.

16 Claims, 6 Drawing Sheets

CONDUCTIVE METAL NETWORKS INCLUDING METAL NANOWIRES AND METAL NANOPARTICLES AND METHODS OF FABRICATING THE SAME

BACKGROUND OF THE INVENTION

Transparent electrodes are used in a wide variety of technologies, including light display technologies (e.g., televisions and cell phones), "smart" windows, and photovoltaic devices (e.g., solar cells). Tin-doped indium oxide (ITO) is one of the most common materials for transparent electrode, with a market of $3 billion (USD) in 2010 and a 20% growth rate through 2013. However, metal-oxide-based transparent electrodes, such as ITO and FTO (fluorine-doped tin oxide) are typically brittle and cannot be used for flexible optoelectronics. In addition, some materials of metal oxide, such as indium, have concerns of resource depletion. Moreover, the formation of a metal oxide transparent electrode generally requires expensive equipment (e.g., high-vacuum evaporator, equipment for sputtering) operated with cooling systems. The power consumption therefore is high, and the process is expensive.

BRIEF SUMMARY OF THE INVENTION

Embodiments of the subject invention are drawn to methods of fabricating a network of metal nanowires having metal nanoparticles present at the junctions where nanowires meet, as well as networks of metal nanowires fabricated by such methods. A metal nanowire network of the subject invention can therefore have metal nanoparticles at the junctions where nanowires meet within the network.

In an embodiment, a method of fabricating a conductive metal nanowire network can include: forming a transparent metal nanowire network comprising a plurality of metal nanowires and a plurality of junctions where metal nanowires meet; immersing the network in a reaction solution; illuminating the immersed network with light for a duration of time sufficient for selective growth of metal nanoparticles at at least a portion of the junctions; removing the network from the reaction solution; and drying the network.

In another embodiment, a conductive metal nanowire network can be fabricated by the method described above, such that the conductive metal nanowire network comprises metal nanoparticles at at least a portion of the junctions of the network.

DETAILED DISCLOSURE OF THE INVENTION

The subject invention relates to an approach of fabricating a metal network with excellent electrical conductivity and optical transparency, which can be used as, e.g., a transparent electrode. Such a transparent electrode can be used in many applications, including but not limited to display panels, organic light emitting diodes, organic solar cells, and organic photodetectors.

Ultrathin metal films or patterned metal grids can potentially offer good optical transmission and high conductivity. Nanotechnology provides the ability to controllably synthesize, purify, and analyze nano-scale materials. Metal nanowires composed of crystal planes with various diameters and lengths can be synthesized using different reactions by inducing anisotropic growth from metal nanoparticles. Randomly-distributed metal nanowires can be used to replace patterned metal films and allow optical transparence through the "holes" between the metal nanowires. In addition to the good optical and electrical properties, metal nanowire electrodes also have the potential of low cost production and large-scale, solution-based processes. However, the conductivity of randomly-distributed metal nanowires is greatly dependent on the density and distribution of silver nanowires on the substrate, which also greatly impacts their optical transparency. In addition to the synthesis of metal nanowires with small diameter, long length, and high purity, the reduction of junction resistance between metal nanowires is a way to improve their electrical conductivity and optical transparency.

Thermal annealing is a technique that can be used to reduce the junction resistance, though it can sometimes cause distortion of a flexible substrate of silver nanowires upon heating. Mechanical pressing and electroplating of gold can be used to fuse silver nanowire junctions, which helps decrease the sheet resistance of the films. However, the difficulty in controlling the process and the possibility of silver nanowires shedding from the substrate in the mechanical pressing approach confines the use to metal nano-networks in real applications. Because of the relatively large optical loss of gold, electroplated gold material on the surface of silver nanowires would greatly increase the optical absorption of an electrode and reduce its transparency. A light-induced thermal nano-welding technique can be used to join gaps between two silver nanowires. The technique utilizes the heating generated from light concentrated in the cross regions under light irradiation. However, a light source with a very high optical power density of approximately 30 W/cm$^2$ (which is about 300 times stronger than a one-sun power density (=AM 1.5G, 100 mW/cm$^2$)), is required for the process. Such a high power requirement confines the application to large scale electrode fabrication due to safety, power consumption, and cost issues. Due to the shortcomings of these processes, a need exists in the art for a new, low-cost, flexible transparent electrode with high transmission and good conductivity, as well as a method of fabricating the same.

Embodiments of the subject invention are drawn to methods of fabricating a network of metal nanowires having metal nanoparticles present at the junctions where nanowires meet, as well as networks of metal nanowires fabricated by such methods. A metal nanowire network of the subject invention can therefore have metal nanoparticles at the junctions where nanowires meet within the network.

Methods according to the subject invention provide a simple and low cost approach for the fabrication of a transparent conductive metal network. In an embodiment, a plasmon-induced photochemical reaction can be used. Under the illumination of light (e.g., ultraviolet (UV) or visible light), a strong electric field can be achieved at the junction region(s) between metal nanowires. Nucleation and growth (e.g., selective nucleation and growth) of metal nanoparticles at these regions can occur, which greatly improves the conductivity as compared to metal nanowires networks before treatment. In addition to the transferable property and the enhanced scattering property, the transparent conductive metal network can exhibit advantages over ITO film in terms of optical performance, electrical performance, flexibility, and cost. In many embodiments, no expensive or hi-tech equipment is required. Low cost materials can be used, and the energy required can also be low, leading to low power consumption. The process can be carried out at room temperature and room atmosphere. No toxic chemicals or by-products are needed or generated during the process.

In an embodiment, a method of fabricating a network of metal nanowires can include: forming the network of metal nanowires comprising a plurality of metal nanowires and a plurality of junctions within the network where nanowires meet; and inducing a photochemical reaction on the network of metal nanowires such that metal nanoparticles are formed at at least one of the junctions. The metal material of the nanoparticles can be different from that of the metal nanowires. Alternatively, the metal material of the nanoparticles can be the same as that of the metal nanowires. The photochemical reaction induced on the network of metal nanowires can be a plasmon-induced photochemical reaction.

The network of metal nanowires can be formed by, for example, depositing a solution of metal nanowires on a substrate through, e.g., spin coating, drop casting, spray coating, Mayer rod techniques, and/or doctor blade techniques. The dimension of the metal nanowires can be any suitable value known in the art; the dimension shown in the examples discuss herein is for exemplary purposes only and should not be construed as limiting. The solvent can be, for example, methanol, ethanol, isopropyl alcohol (IPA), water, or any combination thereof, though embodiments are not limited thereto. The substrate can be any suitable substrate known in the art, including but not limited to glass, fused silica, metal foils, plastic, and a flexible substrate.

The metal nanowires can be silver, gold, aluminum, platinum, palladium, or an alloy thereof, though embodiments are not limited thereto. It should be understood that, though the examples provided herein describe silver nanowires, this is for exemplary purposes only. The metal nanoparticles can be silver, gold, aluminum, platinum, palladium, or an alloy thereof, though embodiments are not limited thereto. The metal material of the nanoparticles can be different from that of the metal nanowires, though embodiments are not limited thereto. For example, the metal material of the nanoparticles can be the same as that of the metal nanowires.

In an embodiment, inducing the photochemical reaction on the network of metal nanowires can include covering or immersing the substrate having the network thereon in a solution and illuminating the covered or immersed network with light in the UV and/or visible range for a suitable duration, thereby leading to growth (e.g., selective growth) of metal nanoparticles at the junctions of the network. The network can then be removed from the solution and allowed to dry. The solvent for preparing the solution can be water, ethanol, methanol, isopropanol, ethylene glycol, glycerin, or a mixture thereof, though embodiments are not limited thereto. The solution can also contain at least one metal salt and at least one reducing agent. The metal salt and reducing agent can be present at suitable concentrations. The metal salt can include the same material as that of the metal nanowires and/or the metal nanoparticles, though embodiments are not limited thereto. In a particular embodiment, the solution can be an aqueous solution with silver nitrate and sodium citrate.

An aqueous solution in which the network is immersed can have at least one metal salt and at least one reducing agent. The ratio of the metal salt to the reducing agent can be, for example, any of the following values or about any of the following values (all ratios are by weight), though embodiments are not limited thereto: 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, or 20:1. The ratio of the metal salt to the reducing agent can be, for example, any of the following values or about any of the following values (all ratios are by volume), though embodiments are not limited thereto: 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, or 20:1.

The concentration of the metal salt can be, for example, any of the following values, about any of the following values, at least any of the following values, no more than any of the following values, or within any range having any of the following values as endpoints (all values are in millimolar (mM)), though embodiments are not limited thereto: 0.02, 0.03, 0.04, 0.05, 0.06, 0.07, 0.08, 0.09, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, or 5.0. For example, the concentration of metal salt within an aqueous solution can be between 0.06 mM and 0.6 mM. In a particular embodiment, the metal salt is silver nitrate and the concentration of silver nitrate within an aqueous solution is between 0.06 mM and 0.6 mM The concentration of the reducing agent can be, for example, any of the following values, about any of the following values, at least any of the following values, no more than any of the following values, or within any range having any of the following values as endpoints (all values are in millimolar (mM)), though embodiments are not limited thereto: 0.02, 0.03, 0.04, 0.05, 0.06, 0.07, 0.08, 0.09, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, or 5.0. For example, the concentration of metal salt within an aqueous solution can be 2.5 mM or about 2.5 mM. In a particular embodiment, the metal salt is sodium citrate and the concentration of sodium citrate within an aqueous solution is 2.5 mM or about 2.5 mM.

The metal salt can be, for example, silver nitrate, silver acetate, Tollens' reagent, silver fluoride, chloroplatinic acid, sodium tetrachloropalladate, potassium tetrachloropalladate, palladium chloride, and/or gold chloride hydrate, though embodiments are not limited thereto. The reducing agent can provide electrons for the reduction of metal ions from the metal salt under light illumination. The reducing agent can be, for example, sodium citrate, citrate acid, acetaldehyde, and/or glucose, though embodiments are not limited thereto.

The light source for illuminating the covered or immersed network can be any suitable light source known in the art, including but not limited to an LED lamp, an incandescent light bulb, a halogen lamp, a xenon lamp, a metal halide lamp, a laser, a solar light, a sun simulator, or any combination thereof, though embodiments are not limited thereto. In many embodiments, the light source can have a dominating emission wavelength of any wavelength in the UV and/or visible range. For example, the dominating emission wavelength of such an LED lamp can be 450 nm, 475 nm, 505 nm, or 530 nm, though embodiments are not limited thereto.

The power density of a light source used to illuminate the covered or immersed network can be, for example, any of the following values, about any of the following values, at least any of the following values, no more than any of the following values, or within any range having any of the following values as endpoints (all values are in milliwatts per square centimeter ($mW/cm^2$), though embodiments are not limited thereto: 0.1, 0.5, 1, 1.5, 2, 3, 4, 5, 6, 7, 8, 9, 10, 15, 20, 25, 30, 35, 40, 45, 50, 55, 60, 65, 70, 75, 80, 85, 90, 95, or 100. For example, the power density can be 5, 10, 20, 30, or 40 $mW/cm^2$. In a particular embodiment, the power density is 30 $mW/cm^2$.

The duration of time the covered or immersed network is illuminated can be, for example, any of the following values, about any of the following values, at least any of the following values, no more than any of the following values, or within any range having any of the following values as endpoints (all values are in minutes), though embodiments are not limited thereto: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, or 100. For example, the illumination duration can be 5-10 minutes, 15-20 minutes, 20-25 minutes, 25-30 minutes, or 60 minutes.

The illumination duration can depend on the power density of the light source. In a particular embodiment, the power density of the light source is 30 $mW/cm^2$, and the illumination duration is in a range of 15-20 minutes. In another embodiment, the power density of the light source is 40 $mW/cm^2$, and the illumination duration is in a range of 5-10 minutes. In yet another embodiment, the power density of the light source is 20 $mW/cm^2$, and the illumination duration is in a range of 20-25 minutes. In another embodiment, the power density of the light source is 10 $mW/cm^2$, and the illumination duration is in a range of 25-30 minutes. In another embodiment, the power density of the light source is 5 $mW/cm^2$, and the illumination duration is about 60 minutes.

The electrical conductivity of an as-dispersed network of metal nanowires without any post-treatment is poor, which can be mainly attributed to the large contact resistance between metal nanowires within the network. The conductivity between the metal nanowires is greatly limited by the incomplete contact or the relative small contact area between nanowires, due at least in part to their round cross section. According to embodiments of the subject invention, though, metal nanoparticles are selectively grown and integrated with the metal nanowires, thereby forming a very conductive network. Despite the poor contact between metal nanowires that typically obstructs the flow of electrons and leads to large contact resistance, a concentrated electric field occurs at the junction region under illumination because of the plasmonic resonance. Generally, a wide wavelength range of light can excite the plasmonic resonance of the crossed metal nanowires. This includes but is not limited to UV and visible light. That is, embodiments of the subject invention can use light of any wavelength, including but not limited to visible light. The selective reduction of metal ions and nucleation of metal nanoparticles on the surface of the metal nanowires occurs at the junction region during the illumination process.

The step of drying the network can be carried out by any suitable process known in the art, including but not limited to blow drying, vacuum drying, hot plate drying, air drying, or any combination thereof.

Methods of the subject invention can be carried out at room temperature and room pressure, i.e., at any suitable temperature and pressure present in a typical indoor setting. Advantageously, no toxic gases or chemicals are needed for the methods, and no toxic gases or chemicals are produced during the methods.

In an embodiment, a network of metal nanowires can include a plurality of metal nanowires, a plurality of junctions within the network, wherein each junction is defined as a point where at least two different nanowires meet, and at least one metal nanoparticle present at at least one of the junctions. The metal material of the nanoparticles can be the same as that of the metal nanowires. In many embodiments, at least one metal nanoparticle can be present at a majority of the junctions. For example, at least one metal nanoparticle can be present at a certain percentage of the junctions.

Figure 4:
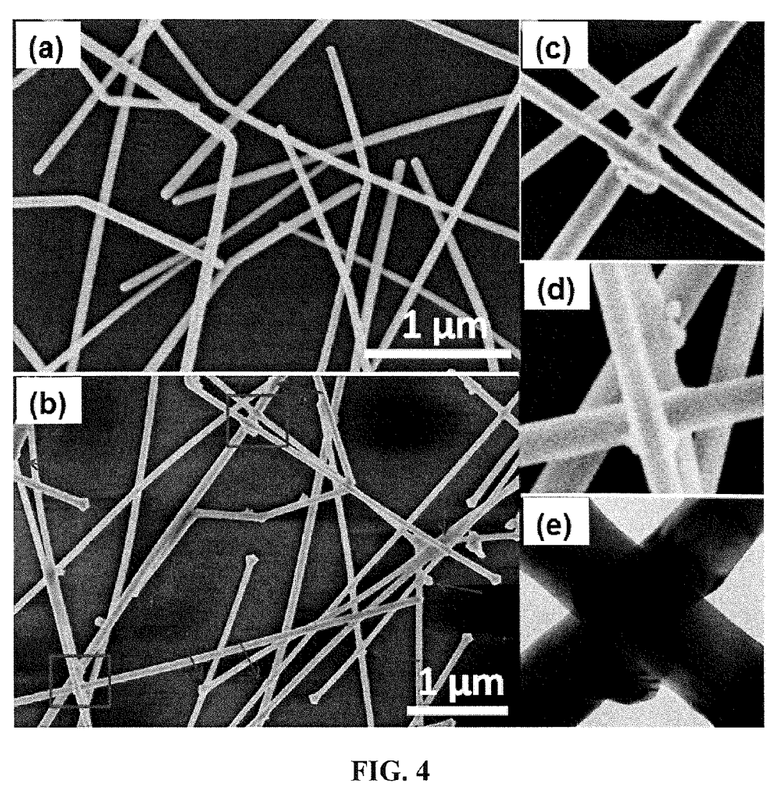
FIG. 4(a) is an SEM image of a nanowire network.
FIG. 4(b) is an SEM image of a nanowire network according to an embodiment of the subject invention.
FIG. 4(c) is a magnified image of the uppermost box from FIG. 4(b).
FIG. 4(d) is a magnified image of the lowermost box from FIG. 4(b).
FIG. 4(e) is a transmission electron microscope (TEM) image of a junction of the network of FIG. 4(b).

FIG. 4(b) is an SEM image of a nanowire network according to an embodiment of the subject invention. FIG. 4(c) is a magnified image of the uppermost box from FIG. 4(b), FIG. 4(d) is a magnified image of the lowermost box from FIG. 4(b), and FIG. 4(e) is a transmission electron microscope (TEM) image of a junction of the network of FIG. 4(b). Referring to FIGS. 4(b), 4(c), 4(d), and 4(e), nanoparticles can be seen at the junctions where nanowires meet.

The percentage of junctions having at least one metal nanoparticle present can be, for example, any of the following values, no more than any of the following values, at least any of the following values, or within any range having any of the following values as endpoints, though embodiments are not limited thereto: 1, 5, 10, 15, 20, 25, 30, 35, 40, 45, 50, 55, 60, 65, 70, 75, 80, 85, 90, 95, 96, 97, 98, 99, or 100. For example, the percentage of junctions having at least one metal nanoparticle present can be at least 75%.

In many embodiments, more than one metal nanoparticle can be present at some or all of the junctions that have at least one metal nanoparticle present.

Following are examples that illustrate procedures for practicing the invention. These examples should not be construed as limiting. All percentages are by weight and all solvent mixture proportions are by volume unless otherwise noted.

EXAMPLE 1

Silver nanowire (with diameter of 100 nm or about 100 nm) ethanol solution was spin-casted on glass substrates in different amounts to form silver nanowire networks. The sheet resistances of the as-dispersed silver nanowire networks were too large to be measured by a four-point probe.

The sheet resistances were still very high even after being annealed at 100° C. for 10 minutes The optical transmittance (at 550 nm) and the sheet resistance before and after the annealing process for each of the eight samples are shown in as samples 1 and 2 in Table 1.

TABLE 1

Optical transmittance and sheet resistance of silver nanowire networks

| Sample number | Silver NWs network (AFTER photochemical treatment) | | Silver NWs network (BEFORE photochemical treatment) |
| --- | --- | --- | --- |
| | Optical transmittance (at 550 nm) | Sheet resistance (ohm/sq) | Sheet resistance (ohm/sq) |
| 1. | 0.948 | 469.3 | ∞ |
| 2. | 0.943 | 228.3 | ∞ |
| 3. | 0.932 | 54.9 | 147225 |
| 4. | 0.915 | 31.7 | 87202.5 |
| 5. | 0.904 | 21.9 | 36579.7 |
| 6. | 0.897 | 20.8 | 31483.5 |
| 7. | 0.894 | 14.9 | 12865.2 |
| 8. | 0.887 | 13.4 | 2787.3 |

EXAMPLE 2

Silver nanowire networks were subject to an induced photochemical reaction as described herein. Each sample was immersed in an aqueous solution having a metal salt and a reducing agent and then illuminated with visible light.

An LED lamp having dominating emission at 450 nm and an optical power density of 30 mW/cm$^2$ (milliwatts per square centimeter) was used as the light source, and silver nitrate and sodium citrate were used as the metal salt and reducing agent, respectively. To investigate the optical transmission and electrical conductivity, the photochemical process was carried out using different concentrations of silver nitrate and sodium citrate in the aqueous solution, and using different durations for illumination with the light source.

Figure 1:
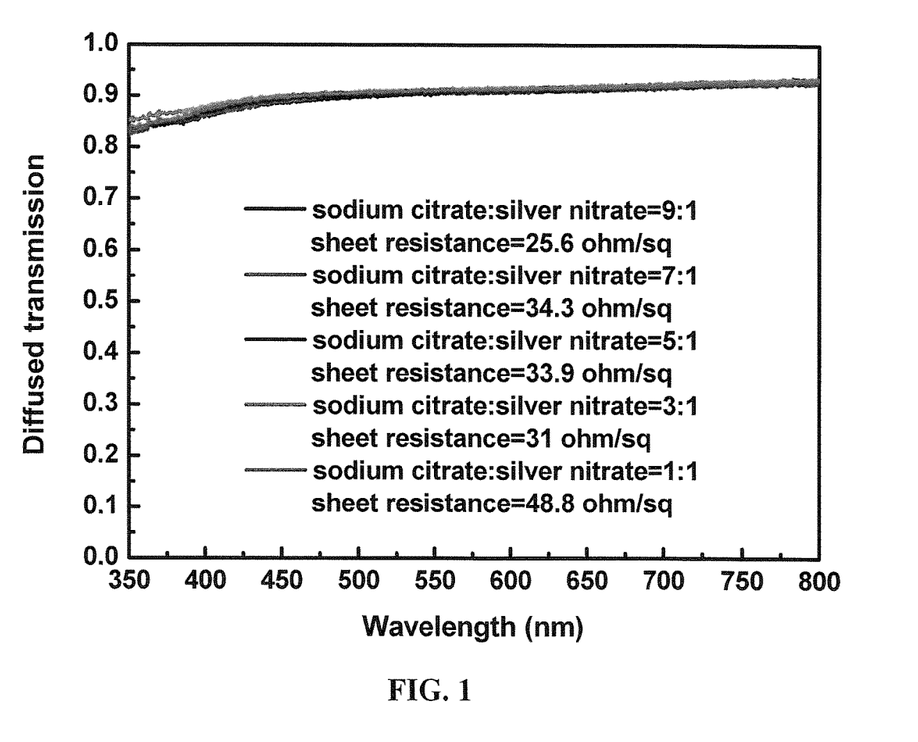
FIG. 1 is a plot of the transmission spectra of conductive nanowire networks according to embodiments of the subject invention.

First, silver nanowire networks after 20 minutes of photochemical treatment using solutions having different sodium citrate/silver nitrate ratios and keeping the silver nitrate concentration constant (0.3 millimolar (mM)), were analyzed. The results are shown in FIG. 1. Referring to FIG. 1, all the samples have similar optical and electrical properties. The sheet resistance of the network treated by a solution containing a 1:1 ratio of silver nitrate and sodium citrate is relatively large, but the results suggest that the solution contained enough sodium citrate for the reduction of silver ions in the photochemical process (i.e., the amount of sodium citrate may more than five times that of silver nitrate in the solution).

Figure 2:
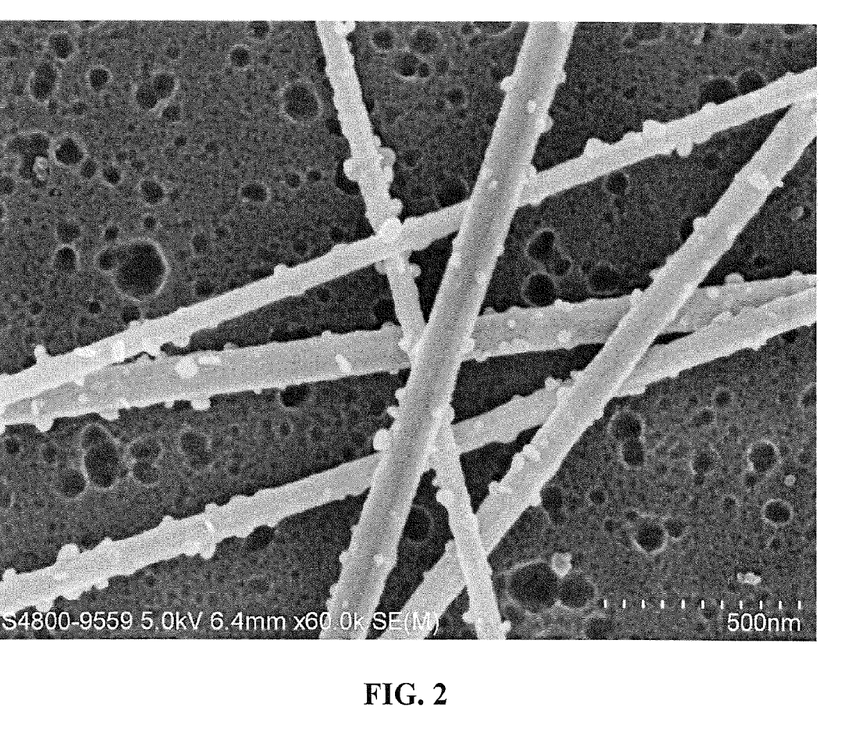
FIG. 2 is a scanning electron microscope (SEM) image of a conductive nanowire network.

Second, the optical and electrical performances of silver conductive networks fabricated using different concentrations of silver nitrate while keeping the sodium citrate concentration constant (2.5 mM) for varying illumination durations were analyzed. Referring to Tables 2 and 3, samples treated with high silver nitrate concentration (such as 2.4 mM and 1.2 mM) had lower optical transparency, which may be due to the nucleation of a high amount of silver nanoparticles around the silver nanowires surface, not merely at the junction regions. This can be seen in the SEM image of FIG. 2. If the silver nitrate concentration is lower than 0.02 mM, there are not enough sources of silver ion for the nucleation of silver nanoparticles, which inhibits the formation of highly conductive networks. A silver nitrate concentration in the range of 0.06-0.6 mM (with sodium citrate concentration of 2.5 mM), and using an illumination duration in a range of 15-20 minutes appeared to give the best results for the plasmon-induced photochemical reaction with the LED lamp having an optical power density of 30 mW/cm$^2$.

TABLE 2

Optical transmittance and sheet resistance at varying concentration and duration

| Silver nitrate concentration/ irradiation duration | Optical transmittance (at 550 nm) | Sheet resistance (ohm/sq) |
| --- | --- | --- |
| 2.4 mM | | |
| 6 min | 0.915 | 136.5 |
| 9 min | 0.907 | 80.1 |
| 12 min | 0.878 | 50 |
| 15 min | 0.854 | 45.3 |
| 18 min | 0.826 | 43 |
| 1.2 mM | | |
| 6 min | 0.914 | 52.5 |
| 9 min | 0.911 | 46.7 |
| 12 min | 0.908 | 38.9 |
| 15 min | 0.905 | 35.8 |
| 18 min | 0.89 | 34 |
| 0.6 mM | | |
| 6 min | 0.923 | 77.9 |
| 9 min | 0.917 | 66.1 |
| 12 min | 0.917 | 59.4 |
| 15 min | 0.915 | 50.7 |
| 18 min | 0.902 | 45.8 |

TABLE 3

Optical transmittance and sheet resistance at various concentration and duration

| Silver nitrate concentration/ irradiation duration | Optical transmittance (at 550 nm) | Sheet resistance (ohm/sq) |
| --- | --- | --- |
| 0.3 mM | | |
| 6 min | 0.926 | 113.8 |
| 9 min | 0.926 | 60.04 |
| 12 min | 0.926 | 50.67 |
| 15 min | 0.919 | 44 |
| 18 min | 0.918 | 43.5 |
| 0.06 mM | | |
| 6 min | 0.93 | 110.9 |
| 9 min | 0.93 | 62.4 |
| 12 min | 0.925 | 57.3 |
| 15 min | 0.924 | 46.8 |
| 18 min | 0.922 | 42 |
| 0.02 mM | | |
| 6 min | 0.933 | 158.1 |
| 9 min | 0.926 | 124.9 |
| 12 min | 0.924 | 74.36 |
| 15 min | 0.923 | 69.76 |
| 18 min | 0.922 | 68.9 |

Figure 3:
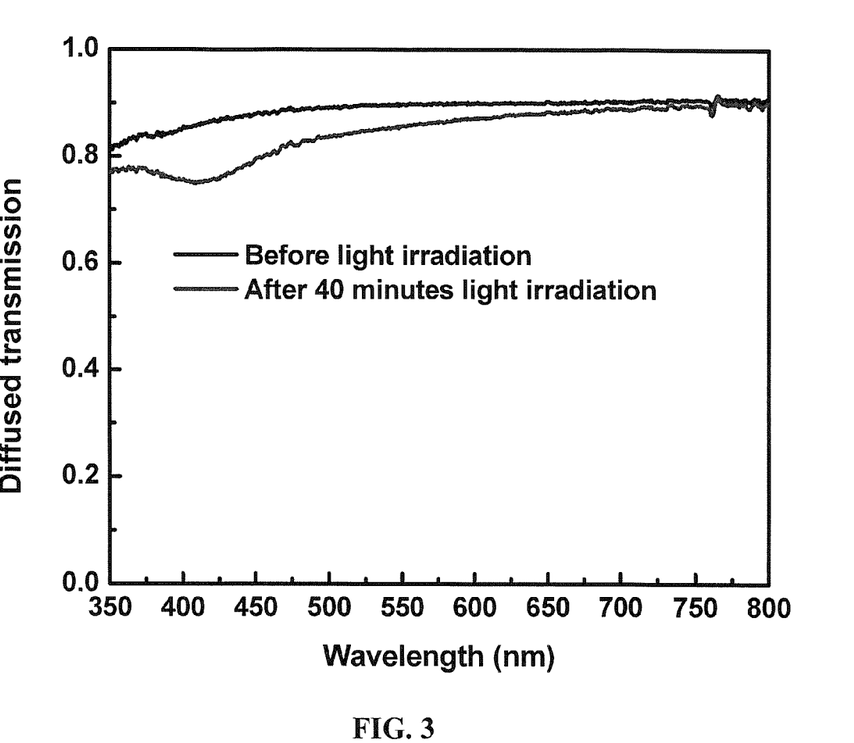
FIG. 3 is a plot of the transmission spectra of a nanowire network before and after 40 minutes of photochemical treatment.

A series of transparent conductive silver nanowire networks were obtained by adopting the suitable fabrication parameters (based on the results in FIGS. 1 and 3 and Table 2). Table 1 shows the optical transmittances at 550 nm and sheet resistances of these networks (samples 3-8). Referring to Table 1, sample 7 showed a sheet resistance of 14.9 ohm/sq and 89.4% transmittance at 550 nm, which has comparable performance to that of the commercial ITO film (20 ohm/sq and 89.5% transmittance at 550 nm).

FIGS. 4(a) and 4(b) are scanning emission microscopy (SEM) images of a silver nanowire network before and plasmon-induced photochemical treatment, respectively. FIG. 4(b) shows an SEM image of the network of sample 7 in Table 1. By adopting proper chemical concentrations and experimental duration (e.g., an aqueous solution with a silver nitrate concentration in the range of 0.06-0.6 mM (with sodium citrate concentration of about 2.5 mM), and using an illumination duration in a range of 15-20 minutes for an LED lamp having dominating emission at 450 nm and an optical power density of 30 mW/cm$^2$), silver nanoparticles mainly appear at junction regions of silver nanowires after light irradiation as indicated by the red arrows and red squares. FIGS. 4(c) and 4(d) show magnifications of the upper and lower red squares, respectively from FIG. 4(b). FIG. 4(e) is a transmission electron microscopy (TEM) image of a junction of the network shown in FIG. 4(b). Referring to FIG. 4(e), silver nanoparticles are present at the junction region. The selective introduction of silver nanoparticles at the junction of silver nanowires increases the contact area between silver nanowires and consequently integrates the silver nanowires and silver nanoparticles as a highly conductive network.

Figure 5:
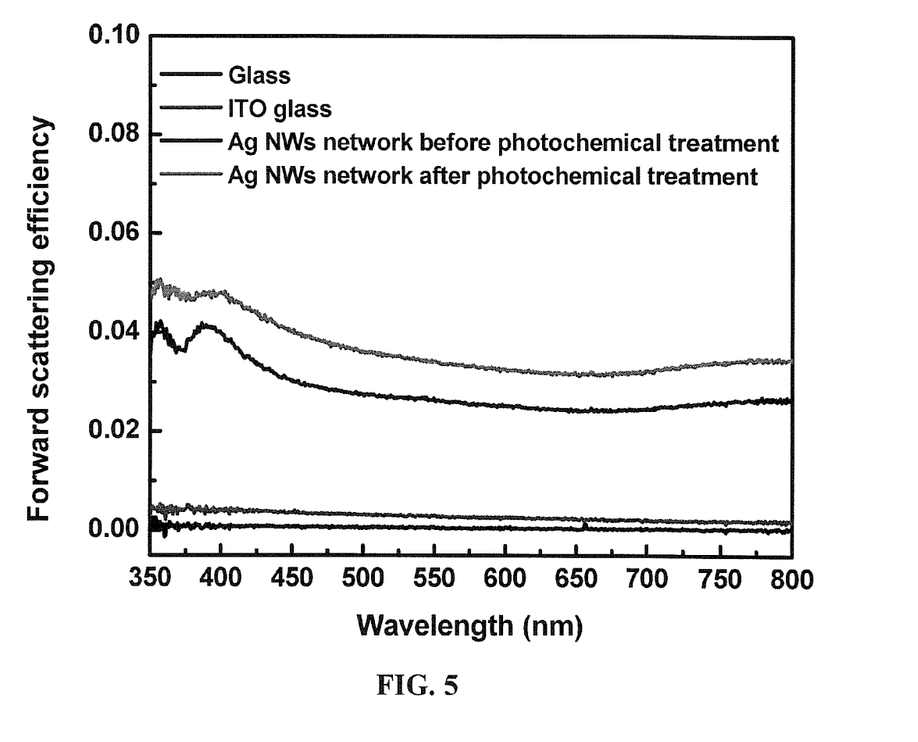
FIG. 5 is a plot of forward scattering efficiency versus wavelength for glass, ITO glass, and nanowire networks.

FIG. 5 shows a plot of forward scattering efficiency versus wavelength for glass, ITO glass, a silver nanowire network before photochemical treatment, and a silver nanowire network after photochemical treatment (e.g., the network of FIG. 4(b) and/or sample 7 of Table 1). The top line in the plot is the silver nanowire network after photochemical treatment; the second line from the top in the plot is the silver nanowire network before photochemical treatment; the second line from the bottom in the plot is the ITO glass, and the bottom line in the plot is the ITO glass. Referring to FIG. 5, silver nanowire networks perform higher forward scattering efficiency than glass and ITO glass due to the scattering property of the silver nanowires. Because of the integration of silver nanoparticles with silver nanowires, the scattering of the conductive network (after photochemical treatment) is further enhanced compared to the corresponding silver nanowire network without photochemical treatment.

Figure 6:
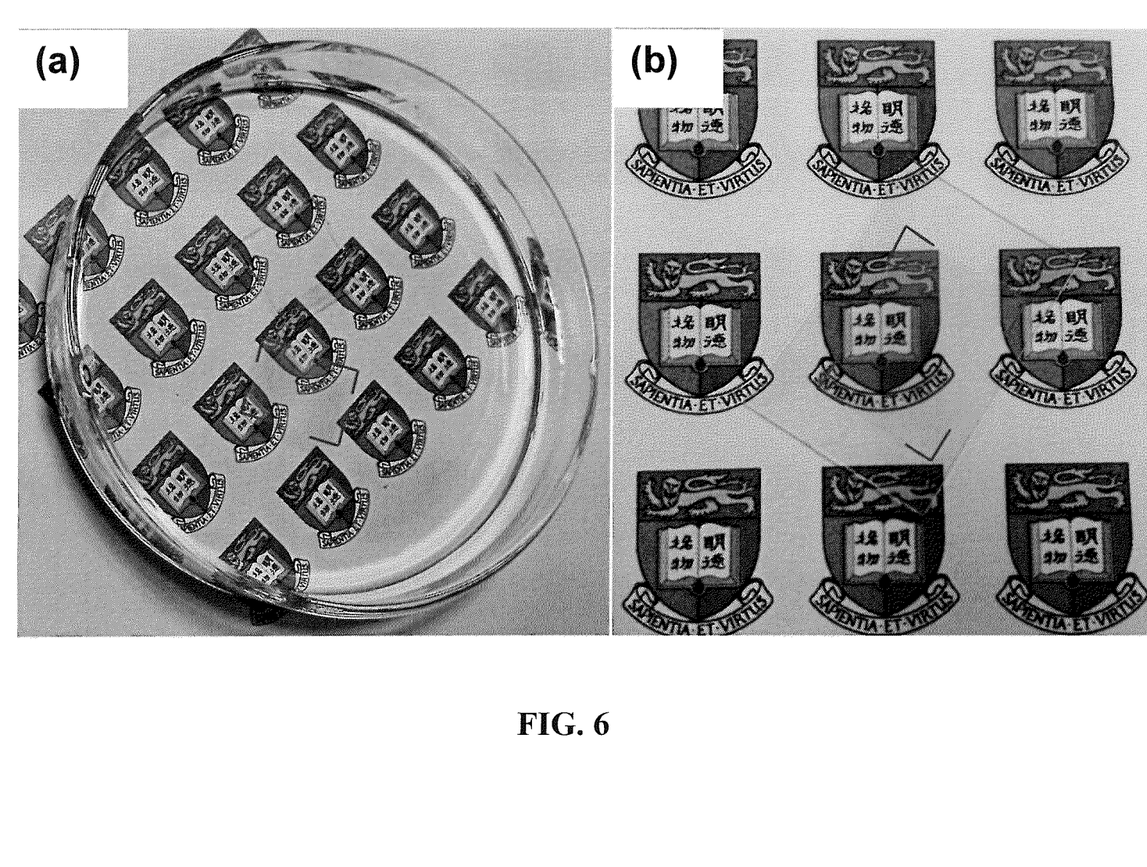
FIG. 6(a) is an image of a nanowire network according to an embodiment of the subject invention floating on water.
FIG. 6(b) is an image of a nanowire network on a polyethylene terephthalate (PET) substrate.

FIG. 6(a) shows the network of FIG. 4(b) floating on the surface of water, and FIG. 6(b) shows the network of FIG. 4(b) on a polyethylene terephthalate (PET) substrate. Referring to FIG. 6(a), the transparent silver conductive network exhibits hydrophobicity after the photochemical treatment. The network will peel off from the substrate and float on the water surface freely when immersed into water, which will allow it to be easily transferred onto any substrate and/or surface. Referring to FIG. 6(b), the conductive network is shown on a PET substrate.

Though an optical power density of 30 mW/cm$^2$ was used for the light source in the examples, this was for exemplary purposes only and should not be construed as limiting. A light or light source with any suitable power density can be used. Depending on the power density of the light source used, the treatment duration may need to be altered for the formation of the conductive transparent network. For example, a treatment duration in the range of 5~10 minutes, 20~25 minutes, 25~30 minutes, or 60 minutes may be used to achieve the best performance of a conductive network by using a power density of 40 mW/cm$^2$, 20 mW/cm$^2$, 10 mW/cm$^2$, or mW/cm$^2$, respectively.

In addition, though the dominating emission of the LED lamp used in the examples was 450 nm, this was for exemplary purposes only and should not be construed as limiting. Light from light sources (e.g., other LED lamps) with a dominating emission at any suitable wavelength can be used, for example, 475 nm, 505 nm, or 530 nm. In addition, a broadband emission light source can be used, such as a halogen lamp or a sun simulator, though embodiments are not limited thereto. Such a light source can also create a strong electric field at the junction regions between silver nanowires, and can help the formation of highly conductive networks through selective integration of silver nanowires and silver nanoparticles.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein (including those in the "References" section) are incorporated by reference in their entirety, including all figures and tables, to the extent they are not inconsistent with the explicit teachings of this specification.

We claim:

1. A method of fabricating a conductive metal nanowire network, the method comprising:
    forming a transparent metal nanowire network comprising a plurality of metal nanowires and a plurality of junctions where metal nanowires meet;
    immersing the network in a reaction solution;
    illuminating the immersed network with light for a duration of time sufficient for selective growth of metal nanoparticles at at least a portion of the junctions;
    removing the network from the reaction solution; and
    drying the network.

2. The method according to claim 1, wherein the reaction solution comprises at least one solvent, at least one metal salt, and at least one reducing agent.

3. The method according to claim 2, wherein the at least one metal salt comprises silver, gold, platinum, aluminum, or palladium.

4. The method according to claim 2, wherein the at least one metal salt is silver nitrate, silver acetate, Tollens' reagent, silver fluoride, chloroplatinic acid, sodium tetrachloropalladate, potassium tetrachloropalladate, palladium chloride, or gold chloride hydrate.

5. The method according to claim 2, wherein the at least one reducing agent is sodium citrate, citrate acid, acetaldehyde, or glucose.

6. The method according to claim 2, wherein the at least one solvent is water, ethanol, methanol, isopropanol, ethylene glycol, glycerin, or a mixture of any thereof.

7. The method according to claim 1, wherein the material of the metal nanoparticles is the same as that of the metal nanowires.

8. The method according to claim 1, wherein the metal nanoparticles comprise silver, gold, platinum, aluminum, palladium, or an alloy thereof, and
    wherein the metal nanowires comprise silver, gold, platinum, aluminum, palladium, or an alloy of any thereof.

9. The method according to claim 1, wherein the step of forming the transparent metal nanowire network comprising a plurality of metal nanowire and a plurality of junctions where nanowires meet comprises:

depositing a formation solution comprising the metal nanowires dissolved therein on a substrate, such that the metal nanowires are randomly distributed on the substrate; and removing the formation solution from the network; and drying the network, wherein depositing the formation solution comprising the metal nanowires comprises spin coating, drop casting, spray coating, Mayer rod techniques, or doctor blade techniques.

10. The method according to claim 1, wherein illuminating the immersed network with light comprises illuminating the immersed network with a light source having a power density in a range of from 5 mW/cm$^2$ to 40 mW/cm$^2$, and wherein the duration of time for which the immersed network is illuminated is in a range of from 5 minutes to 60 minutes.

11. The method according to claim 1, wherein illuminating the immersed network with light comprises illuminating the immersed network with light having a wavelength in the visible spectrum.

12. The method according to claim 1, wherein illuminating the immersed network with light comprises illuminating the immersed network with light for a duration of time sufficient such that at least one metal nanoparticle is grown at at least 75% of the junctions of the network.

13. The method according to claim 1, wherein the metal nanowires are silver nanowires, and wherein the metal nanoparticles are silver nanoparticles.

14. The method according to claim 13, wherein the reaction solution is an aqueous solution comprising silver nitrate and sodium citrate.

15. The method according to claim 14, wherein the aqueous solution comprises silver nitrate present at a concentration in a range of from 0.06 millimolar (mM) to 0.6 mM and sodium citrate present at a concentration of about 2.5 mM, wherein illuminating the immersed network with light comprises illuminating the immersed network with a light source producing light having a wavelength in the visible spectrum.

16. The method according to claim 15, wherein the light source has a power density of 30 mW/cm$^2$ and wherein the duration of time for which the immersed network is illuminated is in a range of from 15 minutes to 20 minutes.

* * * * *